(12) United States Patent
Niederberger et al.

(10) Patent No.: US 6,324,964 B1
(45) Date of Patent: Dec. 4, 2001

(54) AUTOMATIC TEA-MAKING MACHINE

(76) Inventors: Anton Niederberger, Schinhaltenstrasse 20A, CH 6370 Oberdorf NW; Roger Schelbert, Marktstrasse 6A, CH 6436 Muotathal; Ernst Imfeld, Küssnachterstrasse 4, CH 6343 Risch; Guido Singer, Zugerstrasse 39a, CH 6415 Arth, all of (CH)

( * ) Notice: Subject to any disclaimer, the term of this patent is extended or adjusted under 35 U.S.C. 154(b) by 0 days.

(21) Appl. No.: 09/582,617

(22) PCT Filed: Dec. 28, 1998

(86) PCT No.: PCT/CH98/00556

§ 371 Date: Jun. 29, 2000

§ 102(e) Date: Jun. 29, 2000

(87) PCT Pub. No.: WO99/34716

PCT Pub. Date: Jul. 15, 1999

(30) Foreign Application Priority Data

Dec. 30, 1997 (CH) .................................... 2980/97

(51) Int. Cl.⁷ ................. A47J 31/06; A47J 31/40
(52) U.S. Cl. .............. 99/287; 99/302 R; 99/307; 99/317; 99/318
(58) Field of Search ............... 99/287, 286, 280, 99/288, 295, 298, 300, 302 R, 307, 316, 317, 318

(56) References Cited

U.S. PATENT DOCUMENTS

| 4,779,520 | * | 10/1988 | Häuslein | 99/287 |
| 4,815,366 | | 3/1989 | Häuslein | 99/283 |
| 4,983,412 | * | 1/1991 | Häuslein | 99/287 X |
| 5,245,914 | | 9/1993 | Vitous | 99/280 |
| 5,992,299 | * | 11/1999 | Fong | 99/286 |

FOREIGN PATENT DOCUMENTS

| 29619678U1 | 4/1997 | (DE) . |
| 2003382A | 3/1979 | (GB) . |
| WO96/33643 | 10/1996 | (WO) . |
| WO97/22286 | 6/1997 | (WO) . |

* cited by examiner

*Primary Examiner*—Reginald L. Alexander
(74) *Attorney, Agent, or Firm*—Burns, Doane, Swecker & Mathis, LLP

(57) ABSTRACT

According to the invention the tea strainer and propeller of a stirrer are arranged in the tea-preparation chamber in a cooperating manner in such a way that the water flow minimizes the tea-brewing time. A tea-making machine fitted with such a tea-preparation chamber makes it possible for the first time to prepare any kind of tea automatically and very quickly.

10 Claims, 5 Drawing Sheets

AUTOMATIC TEA-MAKING MACHINE

BACKGROUND OF THE INVENTION

The present invention concerns an electrically operable automatic tea-making machine comprising a stand, a cold water container and a tea-preparation chamber.

A simple tea-making machine is known in which tea water is heated, evaporates, condenses, and the condensed water is guided through a tea filter from above to below. Due to the long condensing period, this machine operated tea jar has, however, not succeeded.

SUMMARY OF THE INVENTION

The invention has the object to provide a tea-making machine by which tea can be prepared repeatedly in an automatic way in a very short time and according to any formulation desired. Furthermore, it should be able to be used for any hot beverage where in the course of its preparation a flavor is extracted. This object is achieved by the electrically operable automatic tea-making machine which comprises a stand, a cold water container and a tea-preparation chamber, a sucking tube communicating with said cold water container and a pump and further with a heating chamber and the end of an outflow tube, which leads from said heating chamber, being arranged above said tea preparation chamber which is subdivided in a circular segmental shape by a removable tea strainer and into which a removable propeller of an agitator is inserted, an electronic control unit for controlling all tea-making operations being arranged behind a control panel.

BRIEF DESCRIPTION OF THE DRAWINGS

In the following, an embodiment of the invention is described with reference to the drawing in which.

DETAILED DESCRIPTION OF THE INVENTION

Figure 1:
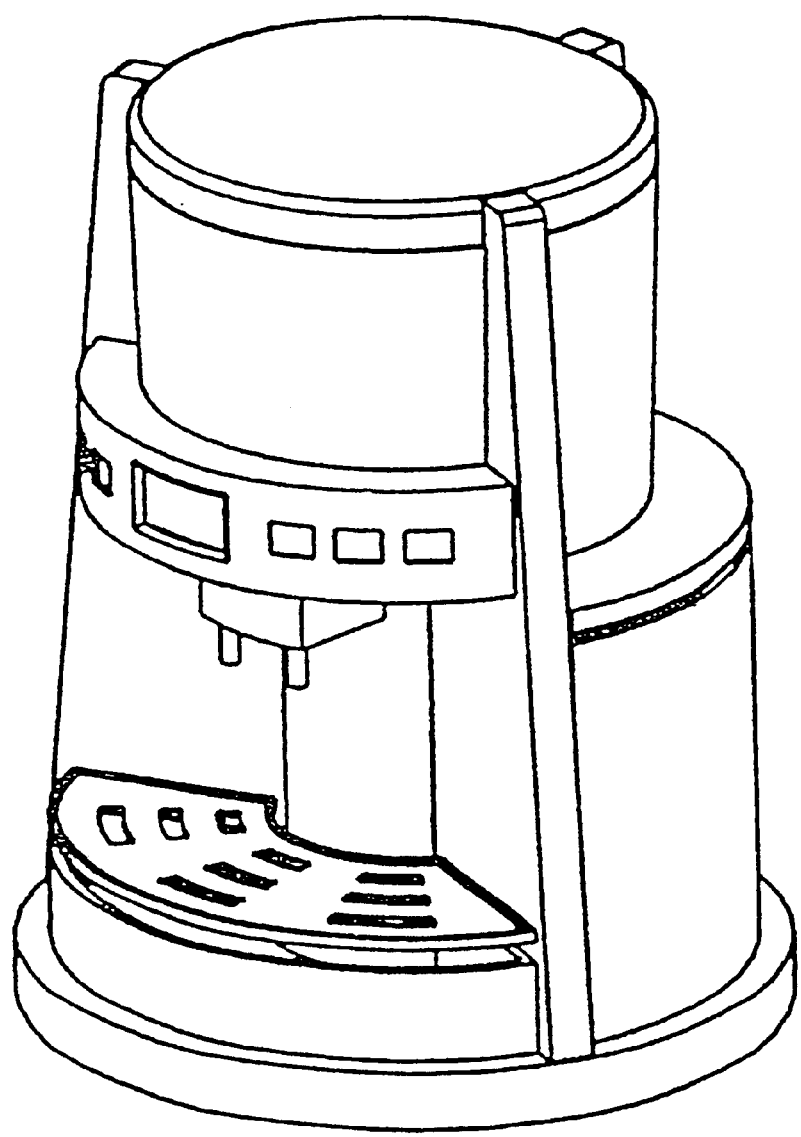
FIG. 1 is a tea-making machine in a perspective view.
Figure 2:
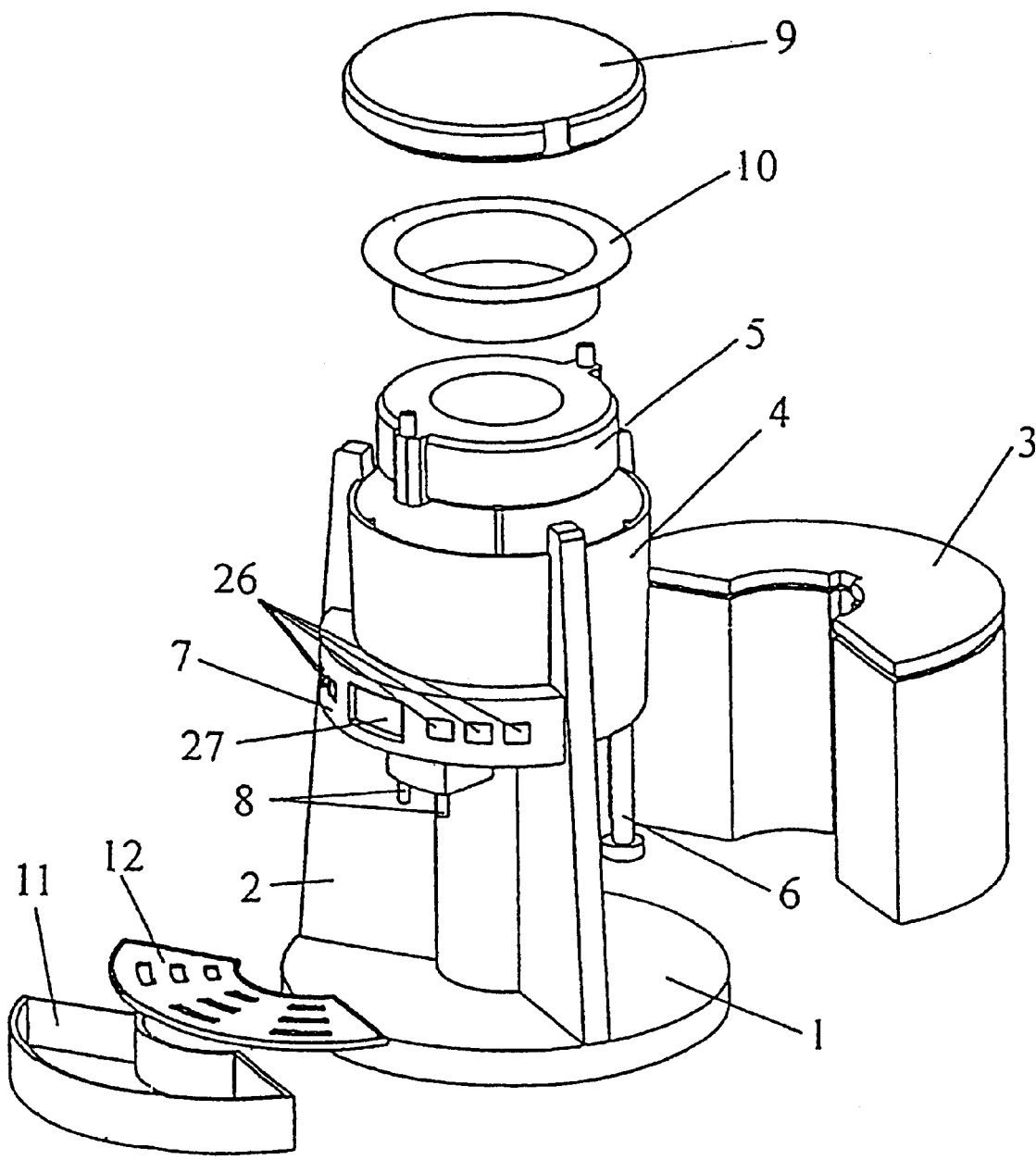
FIG. 2 is a tea-making machine in a perspective, exploded view.

FIG. 2 shows those parts of the tea-making machine which are visible from outside, i.e. a bottom 1 together with a stand post 2, a cold water container 3, a tea-preparation chamber 4, a heating chamber 5, a water sucking tube 6, a control panel 7 having an electronic control unit behind, tea discharging pipes 8 for two pots as well as a cover 9 with a covering insert 10 and a tea collecting receptacle 11 together with its cover 12.

Figure 3:
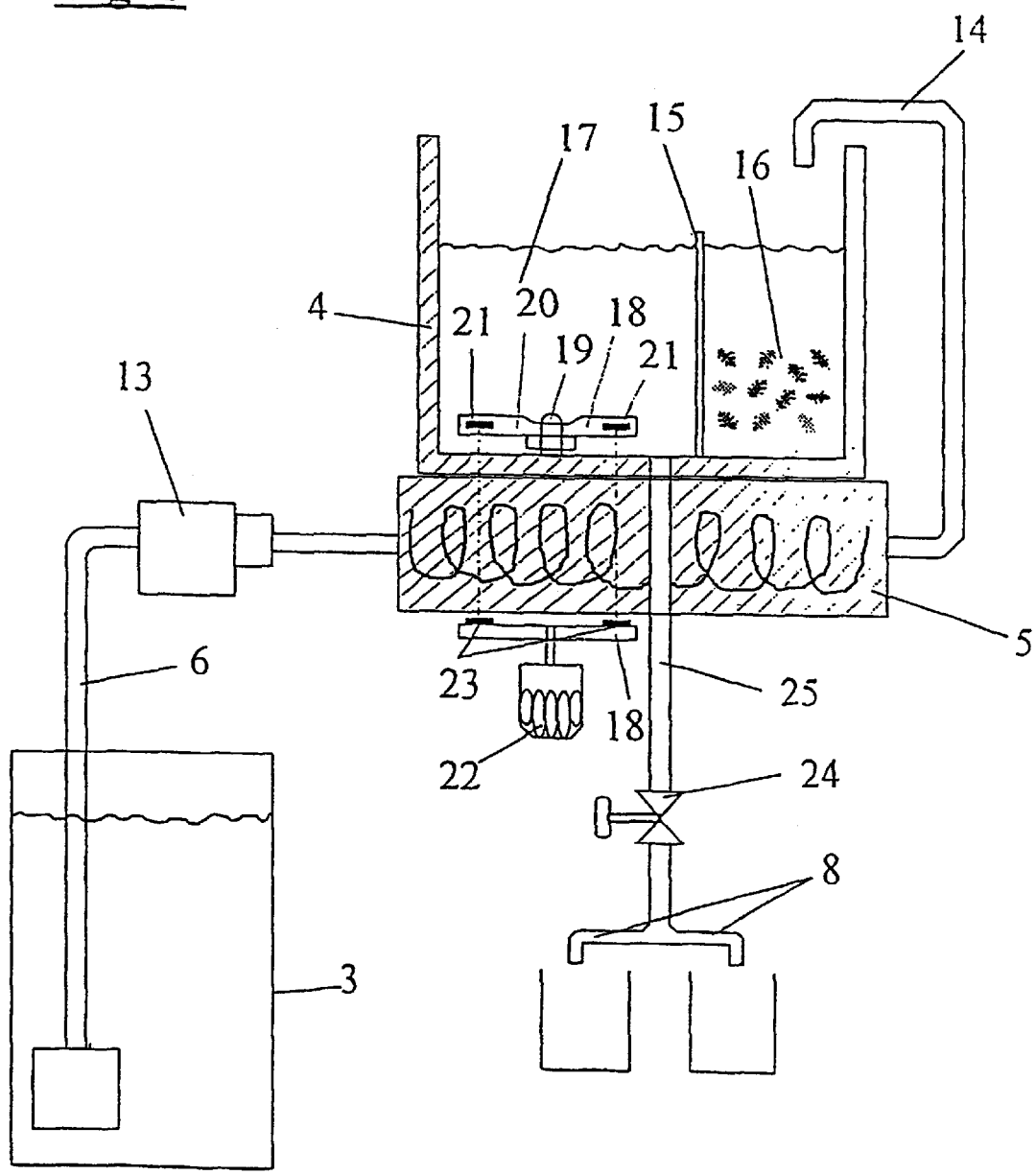
FIG. 3 is a schematic representation of the tea-making machine of FIG. 1 in cross-section.
Figure 4:
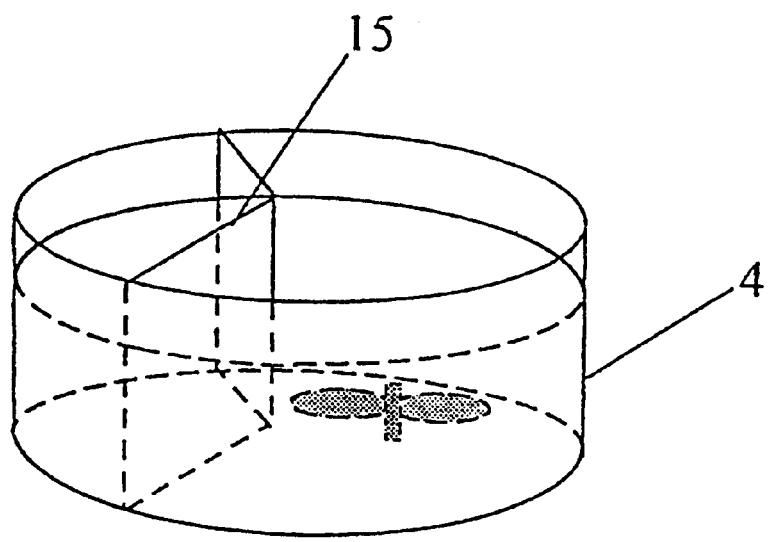
FIG. 4 illustrates schematically the tea-preparation chamber, the tea strainer and the concept of water movement.
Figure 4:
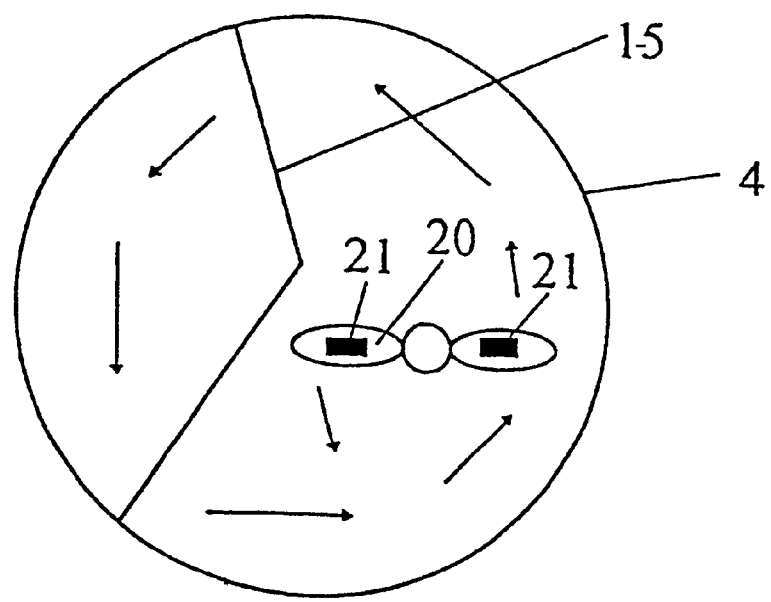
Figure 5:
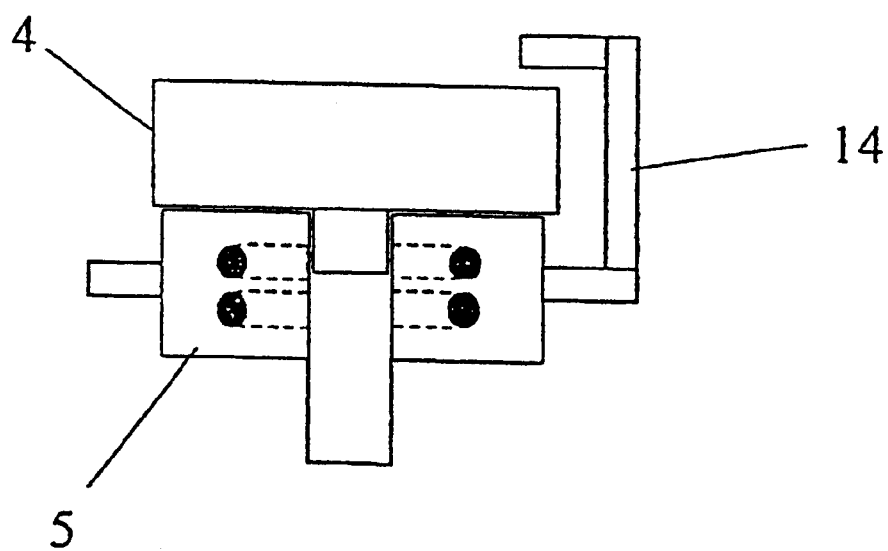
FIG. 5 shows schematically heating the water in the heating chamber and the tea-preparation chamber.

According to FIG. 3, water from the cold water container 3 is sucked when preparing tea through the sucking tube 6 by a motor operated pump 13, and is conducted through the electrically heated annular heating chamber 5 and further through the outflow tube 14 into the tea preparation chamber 4 from above, water being heated in flow in the heating chamber 5 up to the desired temperature. The tea substance 16 to be extracted and being in the form of leaves, powder, granules or bag, covered by hot tea water 17, is in a tea strainer 15, the circular segmental shape of which being shown in FIG. 4, and which may be inserted into the tea preparation chamber 4 and may be removed for cleaning purposes. Outside the tea strainer 15 is an agitator 18 by which the water 17 is set into turbulent motion so that it continuously flows over the tea substance 16 which has the consequence that extraction of the tea substance occurs in a minimum time period. The agitator 18 consists of a plastic propeller 20 put onto an axle journal 19, but removable for cleaning purposes into which small magnets 21 are inserted, the propeller being rotated by counter-magnets 23 driven by a motor 22 below the tea preparation chamber. While tea is prepared in this manner, the tea water 17 is kept at the desired temperature by the heating chamber 5 arranged below the tea preparation chamber (FIG. 5). After an adjusted extraction time, a valve 24 in a discharge conduit 25 opens so that the finished tea can flow through the discharging pipes 8 into pots provided.

The whole tea preparation procedure is controlled automatically by a control unit not shown in the drawing, but being arranged behind the control panel 7. The menu of tea preparation can be input individually in such a manner that quantity, temperature and extraction time can be controlled in accordance to the desired tea formulation. If desired, the input menu can be memorized under a name and can be made visible on a display 27 and started by pressing a key. Further menus for special tea sorts can also be memorized directly.

According to a further embodiment of a tea-making machine, different tea sorts can be in a turret ring above the tea preparation chamber 4 and may be lowered individually into the tea strainer 15 and lifted from it in accordance with a memorized menu so that a fully automatic tea preparation is possible.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Electrically operable automatic tea-making machine comprising:

a stand;

a cold water container and a tea-preparation chamber;

a sucking tube communicating with said cold water container, a pump and a heating chamber;

an outflow tube, an end of the outflow tube which leads from said heating chamber being arranged above said tea preparation chamber, the tea preparation chamber being subdivided in a circular segmental shape by a removable tea strainer and having a removable propeller of an agitator therein; and an electronic control unit for controlling tea-making operations arranged behind a control panel.

2. Tea making machine according to claim 1, wherein a drive for said agitator comprises counter-magnets driven by a motor as well as magnets inserted into said propeller.

3. Tea making machine according to claim 1, wherein the heating chamber is annular and is below the tea preparation chamber in such a manner that water is heated in flow up to a desired temperature and is kept at said desired temperature in said tea preparation chamber.

4. Tea making machine according to claim 1, wherein data, including at least one of quantity, temperature and steeping time, of a tea formulation is input, memorized and read out by keys of said control panel which cooperate with said electronic control unit.

5. Tea making machine according to claim 1, wherein a turret ring with individually inserted different tea sorts is arranged above the tea preparation chamber.

6. Tea making machine according to claim 2, wherein the heating chamber is annular and is below the tea preparation chamber in such a manner that water is heated in flow up to a desired temperature and is kept at said desired temperature in said tea preparation chamber.

7. Tea making machine according to claim 2, wherein data, including at least one of quantity, temperature and steeping time, of a tea formulation is input, memorized and read out by keys of said control panel which cooperate with said electronic control unit.

8. Tea making machine according to claim 3, wherein data, including at least one of quantity, temperature and steeping time, of a tea formulation is input, memorized and read out by keys of said control panel which cooperate with said electronic control unit.

9. Tea making machine according to claim 3, wherein a turret ring with individually inserted different tea sorts is arranged above the tea preparation chamber.

10. Tea making machine according to claim 4, wherein a turret ring with individually inserted different tea sorts is arranged above the tea preparation chamber.

* * * * *